United States Patent [19]
Newton, Jr.

[11] 3,894,255
[45] July 8, 1975

[54] SYNCHRONOUS MACHINE FOR STEPPING MOTOR AND OTHER APPLICATIONS AND METHOD OF OPERATING SAME

[76] Inventor: George C. Newton, Jr., Concord Rd., Lincoln, Mass. 01773

[22] Filed: Jan. 11, 1973

[21] Appl. No.: 322,638

[52] U.S. Cl. .................. 310/80; 310/83; 310/49
[51] Int. Cl. .................................. H02k 7/10
[58] Field of Search ............ 310/82, 83, 46, 49, 80

[56] References Cited
UNITED STATES PATENTS
3,452,227  6/1969  Welch ............................. 310/80 X
FOREIGN PATENTS OR APPLICATIONS
732  1877  United Kingdom ................. 310/82

*Primary Examiner*—J. D. Miller
*Assistant Examiner*—Robert J. Hickey
*Attorney, Agent, or Firm*—Rines and Rines; Shapiro and Shapiro

[57] ABSTRACT

This invention pertains to synchronous machines for use as stepping motors, preferably of configurations that have armature motion normal to the air gap and with very small armature movements. Several ways of converting such small armature movements into suitable output movement are set forth wherein the thickness variations of the air gaps are limited such that the magnetic flux, under conditions of near maximum machine performance, changes fractionally substantially less than the fractional change in the air gap thickness.

29 Claims, 12 Drawing Figures

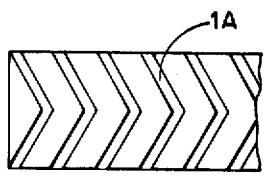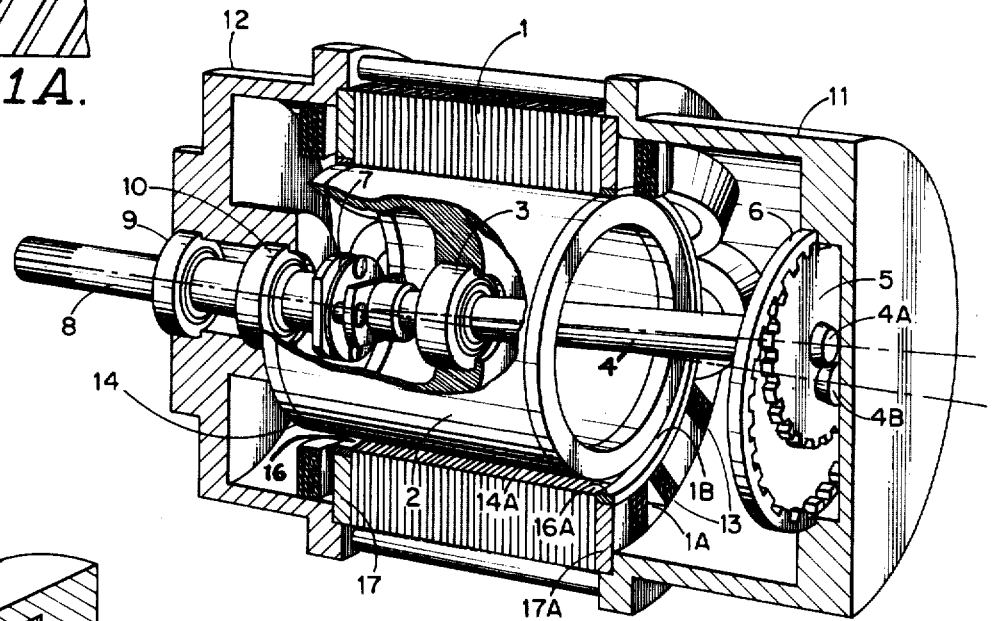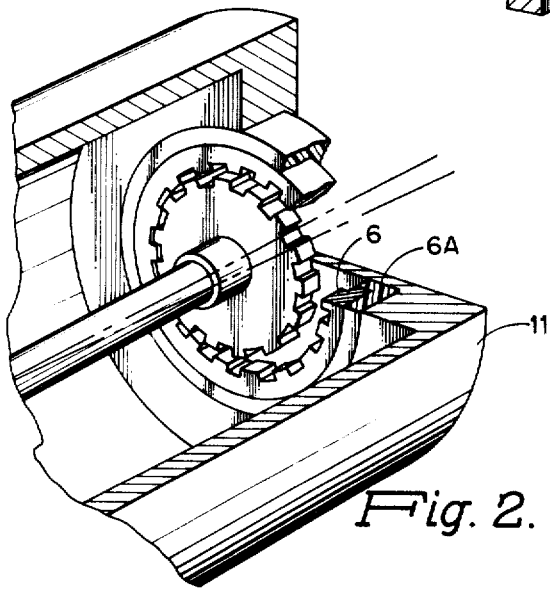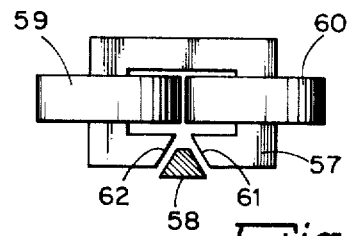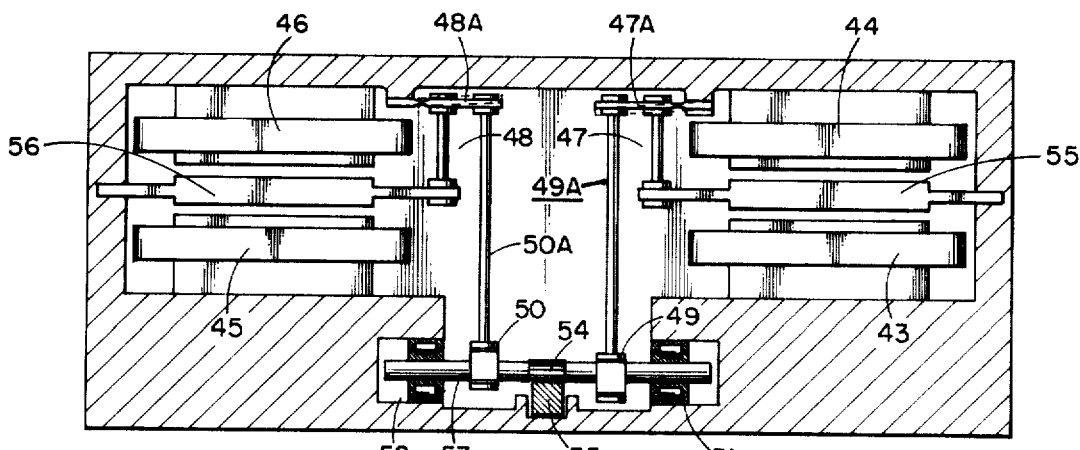

SYNCHRONOUS MACHINE FOR STEPPING MOTOR AND OTHER APPLICATIONS AND METHOD OF OPERATING SAME

The present invention relates to synchronous machines and methods, being more specifically concerned with such apparatus employed as stepping motors and similar and other devices. In connection with the application to stepping motors and the like, the invention has as an object improved performance of stepping motors designed for rapid starting and stopping. For some time, the acceleration capabilities of stepping motors have been limiting the performance that can be achieved in point-to-point positional control systems. In connection with prior stepping motors of the type described in A. E. Snowden, et al., "Characteristics of a Synchronous Inductor Motor" Trans. AIEE (Applications and Industry) Vol. 81, March 1962, pages 1–5, for example, such performance is restricted by excessive rotor inertia; and, with other prior types of construction, such as is described in U.S. Pat. No. 3,169,202, the performance has been limited by excessive magnetic reluctance of the flexible armature, among other factors. If high stepping rates, of the order of 2,000 steps per second, are to be achieved with permanent-magnet or variable-reluctance stepping motors typical of the current state of the art, it has frequently been necessary to use acceleration and deceleration circuitry in order to space the driving pulses during starting and stopping so as to prevent the acceleration requirements from exceeding the motor's capability. Such special circuitry is described, for example, by D. W. Kennedy in a technical note "Discrete Feedback Dynamic Control of Stepping Motors" published by Icon Corporation, Cambridge, Mass. But, this approach, in addition to complicating the motor control logic, disadvantageously imposes additional requirements on the programs that generate the numerical commands for such control systems.

In accordance with the present invention, by providing acceleration capability of the stepping motor that is high enough, it is often possible to control the movement of the output shaft by simply turning on or turning off pulse trains of constant frequency, thereby eliminating the complications of the before-mentioned special acceleration circuitry and other more involved system programming. It is, therefore, a primary object of the invention to provide new and improved stepping motors that have the highest possible performance within the limitations imposed by available materials of construction, and to a large measure void of these prior-art disadvantages.

A further object is to provide a novel synchronous machine and method of operation of more general applicability, as well.

In may paper, "Stepping Motor Performance Characterization for Point-to-Point Positional Control," Preprints of the Joint Automatic Control Conference published by Institute of Electrical and Electronic Engineers in July, 1971, the general problem is presented of finding a rational basis for characterizing stepping motors, so that an appropriate machine can be selected for driving a specified load. A solution that applies to motors used for incremental, point-to-point, open-loop, positional control has been found, wherein it is assumed that the driving circuitry that is employed therein, is capable of establishing motor currents that are substantially square waves, and that the motor must remain synchronized for suddenly applied changes in stepping frequency. Under such conditions, the motor is found to be characterizable by two parameters: the work per step $W_s$, and the upper limit on the start-stop stepping frequency $N_{uf}$ when the motor runs free of its load. In terms of these two parameters and the load specifications, a procedure has thus been developed for motor size determination. The load is specified in terms of its inertia, maximum required speed, maximum allowable step size, and a bound on its friction torque magnitude. An additional result of this design procedure is a determination, after the motor has been selected, of appropriate ratios for the gearing or linkage used to couple the motor to its load.

The analysis of the above-mentioned paper further shows that, in general, the relative importance of the work per step and the upper limit on the stepping frequency is a function of the load specifications, such that no tradeoff apparently exists between these two parameters. For loads that are characterized by negligible inertia and thus solely in terms of their friction torque, however, it can be shown that the product of the work per step times the upper limit on stepping frequency ($W_s N_{uf}$) completely defines the load-driving capability of the motor. Thus, a rough figure of merit for a stepping motor resides in this product. It should be noted that the step size $S_m$, the torque rating $F_m$, and moment of inertia $M_m$ are not significant in and of themselves, but only insofar as they enter into the work per step and the upper limit on the start-stop stepping frequency.

Although the designer of a stepping motor should be primarily concerned with the achievement of large values for the work per step and the upper limit on the stepping frequency, there is still the question of appropriate additional design parameters for distinguishing among motors that have comparable values of the first two parameters. Among these additional characteristics are motor size, heating loss associated with the $I^2R$ dissipation in the motor windings, the inductance or energy stored in the windings (particularly that component not converted to mechanical work), as well as a number of additional factors, including noise, life and reliability, among others.

It is a further object of this invention, accordingly, to minimize the size of machine required to obtain desirable levels of the work per step and the upper limit on the stepping frequency, as well as to keep the other above-mentioned characteristics within satisfactory bounds; specifically, especially avoiding excessive motor heating and keeping the stored energy in the motor windings as low as practical, (the latter relating directly to the volt-ampere ratings of the semiconductor driving components.)

Another factor of importance in stepping motor operation is the time required for the output member and the load coupled to it to settle into its rest position, following a sequency of steps. This settling time is related to the motor damping characteristic. In addition to the natural damping characteristics inherent in a particular motor configuration, moreover, it is often necessary to provide additional damping either through external or internal means. Another object of the present invention, therefore, is to provide improved damping in a stepping motor in an efficient and simple way.

A comparative study has been carried out, further, in order to determine how the two key parameters, the work per step and the upper limit on the stepping frequency, vary as a function of motor size. This study is summarized in my paper "Variable-Reluctance Stepping Motor Performance Capabilities for Point-to-Point Positional Control" to be published in the proceedings of the Fifth Congress of International Federation of Automatic Control (Paris, June 1972) by the Instrument Society of America. The results indicate that the performance of motors with armature motion normal to the air gap exceeds that of motors with motion parallel to the air gap over a range of motor size from the smallest up to machines much larger than would be contemplated for directly actuated electromechanical devices. In particular, this study has indicated a five-to-one advantage for motion normal to the air gap at a motor size represented by a stator diameter of approximately four inches. Because motion normal to the air gap has been found to offer such a large advantage, it is important, for its commercial use, to find a practical solution to the problem inherent in machines with motion normal to the air gap of converting very small armature movements of an oscillatory nature into unidirectional motion of the output element of the machine. In order to reduce the effects of armature inertia on the upper limit of the stepping frequency, practical designs of stepping motors using motion normal to the air gap may require armature displacements to be no larger than 0.005 to 0.010 inch. Such small movements have heretofor prevented the practical realization of the full performance potential of the variable-reluctance principle, with motion normal to the air gap, since there has not been a suitable means for converting such movements into unidirectional motion of the output element.

Among several prior-art proposals in this general field have been the use of a so-called harmonic drive with flexible gearing as described, for example, in U.S. Pat. No. 3,169,202, such structures are not useful for the particular purposes of the present invention because of the inherent relatively large air gap that becomes developed in the motion of the armature, at least for speed reduction ratios used in many applications. Similarly remarks apply to the proposal to use special gear tooth forms such as "gerotor" gears as illustrated in U.S. Pat. No. 3,334,253, wherein the armature is coupled through a double universal joint to an output shaft, but where the substantial eccentricity produces corresponding large air gaps.

Prior proposals of somewhat related though actually different applications, such as embodying bent armature shafts driving a swash plate for providing nutating armature motion (U.S. Pat. No. 3,322,984) or a nutating working plate armature controlling an output shaft at reduced speed through the use of involute gears (U.S. Pat. Nos. 3,585,425 and 3,585,426), are similarly not adaptable to solve the problems of the present invention either in terms of the required degree of gear reduction (in the case of the bent armature shafts), or in the requirement of too large an armature movement for the required optimum performance criteria underlying the present invention.

The use of a gyrating non-rotating armature (as, for example, in U.S. Pat. No. 2,437,904) again requires excessive gap dimensions for gear ratios and machine sizes of greatest interest. In devices of the type disclosed in U.S. Pat. No. 3,456,139, wherein a cylindrical hollow armature teeters on a ball pivot and drives the output shaft by gears of one tooth difference, the same excessive air gap movement is required.

In accordance with the present invention, on the other hand, unlike all of these excessive air gap systems with their attendant disadvantages, the armature is arranged to operate in substantial parallelity to the stator in the region of closest approach thereto, and has its oscillatory movement amplified by mechanisms a portion of which is non-rigidly or flexibly connected to the armature, thus enabling the fulfillment of the criteria underlying the invention for vastly improved performance, consistent with minimal air gap and other dimensions.

It is another objective of this invention, therefore, to provide an apparatus that admirably solves the problem of converting armature motion into movement of the output element in an efficient manner. As will be seen hereinafter, this is done by first amplifying the armature motion by suitable linkage which, in turn, drives the means for converting oscillatory motion of the armature into unidirectional movement of the output element.

Other and further objects will be explained hereinafter and are more particularly delineated in the appended claims. In summary, however, from one aspect, the invention contemplates a synchronous machine for stepping motor and other use, having, in combination, stator means comprising a plurality of poles associated with a corresponding plurality of windings; means for applying current pulses to the windings in a plurality of electrical phases; armature means mounted to move so as effectively to vary the thickness of the air gaps of the said poles; output means carried by a housing containing the stator and armature means; means for mechanically amplifying the air-gap-varying movement of the armature means wherein at least some of the amplification is achieved by a part non-rigidly connected to the armature means; and conversion means connected to said amplifying means and to said housing, for converting the amplified movement of the armature means into movement of said output means unidirectionally for at least more than one half cycle of the armature means movement.

From another viewpoint, the invention, in summary, contemplates a synchronous machine for stepping motor and other use, having, in combination, housing means; stator means provided with a plurality of poles, fixed in said housing; armature means separated by variable-thickness air gaps from said poles; electrical means, comprising windings connected with current sources for sequentially magnetizing said stator poles, thereby producing magnetic flux in the air gaps associated with the magnetized poles; suspension means for maintaining said armature means properly oriented with respect to said stator means while permitting oscillatory movement thereof in directions to substantially vary the thickness of said air gaps; an output member mounted in bearings to accommodate movement with respect to said housings means; means for mechanically amplifying the oscillatory movements of said armature means; conversion means, interconnecting said amplifying means, housing means and output member, for converting the amplified oscillatory movement of the armature means into movement of said output member that is unidirectional for at least more than one half cycle of armature means movement; and means for limiting the thickness variations of said air gaps such that the said magnetic flux, under conditions of near maximum machine performance, changes substantially less than the corresponding fractional change in the air gap thickness. Preferred details are later described.

The invention will now be described with reference to the accompanying drawings wherein:

FIG. 1 illustrates a cross-sectional view of a preferred configuration of a motor incorporating the invention which employs an armature that rolls on the inside of the stator;

FIG. 1A shows a development of the stator inside surface used to achieve smooth rolling action of the armature;

FIG. 2 is a sectional view of damping means used to mount the internal gear structure of FIG. 1;

FIG. 6 is a cross-sectional view illustrating a third configuration which produces linear motion of the output element;

FIG. 7 is a sectional view of the magnetic components used to achieve low armature inertia that is useful in configuration embodiments such as FIGS. 3 and 6;

Figure 3:
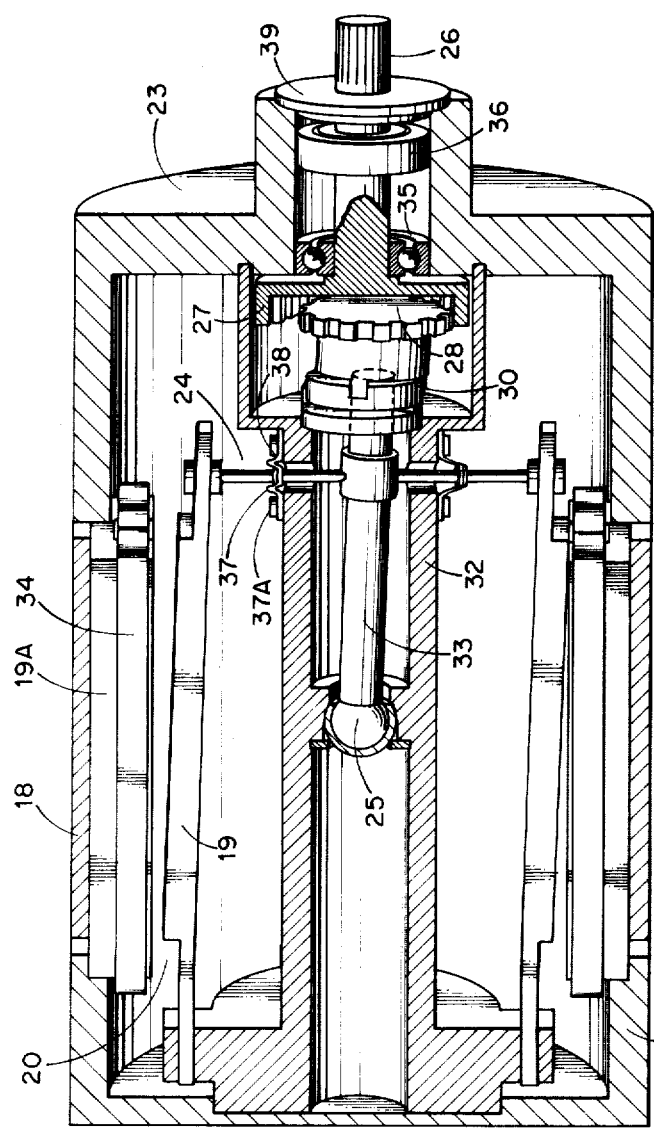
FIG. 3 is a longitudinal cross-sectional view of a modified motor configuration having a segmented armature.

The embodiment of the invention shown in FIG. 1 will now be described, the figure illustrating sectional views of certain parts of the machine and side views of other parts, with the section plane passing through the axis of the machine. A stator 1 contains slots 1A, having windings 13. Currents in these windings 13 cause the stator teeth, such as 1B, to become magnetic poles. An armature 2 of outer rotational diameter smaller than the inner diameter of the stator 1, is located within the stator. The output element of the machine is the shaft 8, which is held by bearings 9 and 10 contained in a lefthand end bell 12. Shaft 8 is driven by an inner gear 5 through an inclined, off-longitudinal-axis, gyrating shaft 4 and a universal joint 7, based upon the flexing of a thin metal washer. The armature 2 is attracted to the side of the stator where one or more windings are excited, and, by suitable circuitry and connection of the windings into phases driven by the circuitry, as later explained, the location of the magnetic poles can be made to progress circumferentially around the stator 1. This causes the armature 2 to roll inside the stator 1. Bearing 3, located inside the armature 2, causes the shaft 4 to gyrate, with its axis performing conical motion, causing the inner gear 5 to engage the outer gear 6 at a point that moves around the circumference of the latter. Because the outer gear is held stationary in the opposite or right-hand end bell 11 and because the inner gear 5 has fewer teeth than the outer gear 6, each revolution of the point of engagement causes the inner gear to rotate through an angle corresponding to the difference in the number of teeth of the two gears.

Disengagement of the internal and external gears should not occur, even if the output element lags the magnetically commanded angle by a sufficient amount so that the magnetic force tends to cause separation. This is so because, if separation does occur, synchronism is lost. In order to prevent disengagement, thus, the tooth forms of the outer and inner gears 6 and 5 and the number of teeth for each, are selected so that the inner gear is prevented from disengaging through the support (bridge effect) given by teeth either side of the point of engagement or meshing. Alternatively, disengagement can be prevented by providing shaft 4 with a tip 4A that moves around a similar stationary tip 4B located in end bell 11. These tips must be quite small in practical machines and therefore are preferably constructed of very hard materials, such as diamond or sapphire. A third way of preventing disengagement is to use gears of such tooth form that the tips of the inner gear teeth in the region diametrically opposite the point of engagement pass by the tips of the outer gear teeth in this region with minimal clearance. The inner gear may thus be supported by contact between the tooth tips in this region when the forces acting upon it cause a slight movement in a direction toward disengagement. Gears of the before-mentioned gerotor tooth form are an example of the kind of gears in which disengagement is prevented in this manner.

For the embodiment shown in FIG. 1, the hypocycloidal motion of the armature causes the air gap thickness under a pole to vary in an approximately sinusoidal manner about its average value as a function of the angle of the line of rolling contact between the armature 2 and the inner surface of the stator 1, with the approximation becoming more exact as the relative difference betweeen stator and armature diameters is made smaller. For each revolution of line of contact and corresponding revolution of the point of engagement between the inner and outer gears, there is a full cycle of variation of air gap thickness under each pole. Gears 5 and 6 thus cooperate with the gyrating shaft 4 and the universal joint 7 to convert the oscillatory air gap thickness variations, transmitted by the armature 2, bearing 3, and amplified by shaft 4, into uni-directional rotation of the output shaft 8. In particular, the conversion means, represented by the parts 5, 6, 4, and 7, changes into unidirectional movement of the output shaft 8, the oscillatory movement of the armature 2 after amplification by shaft 4, said uni-directionality persisting for at least more than one-half cycle of armature movement.

It will be noted from FIG. 1 that the shaft 4 acts as a lever with its fulcrum at the center of the universal joint 7. This lever mechanically amplifies the radial motion of the armature 2 in order to produce sufficient displacement so that the peak-to-peak motion of the inner gear 5 can be accommodated. The combination of the two gears 5 and 6 converts the oscillatory motion of shaft 4, represented by the projection of the gyrating motion of its axis on the sectional or any other plane containing the axis of the output element 8, into rotary motion that is then conveyed to the output element.

In the simplest embodiment of this machine, the windings 13 passing through the several stator slots are connected into four phases. The driving circuitry causes the phase currents to be either "on" or "off." In response to the pulses delivered to the driving circuitry, substantially square waves of currents are produced in the phases in such a manner that two phases are always excited and two phases are always off. If, for example, phases 1 and 2 are initially excited, the receipt of a pulse corresponding to forward rotation, would cause phase 1 to be turned off and phase 3 to be turned on. The next forward pulse would cause phase 2 to be turned off and phase 4 to be turned on, and so on. The effect of this sequencing of the phase currents is to cause the equilibrium position of the rolling line of contact of the armature with the stator to progress in 90° steps with corresponding movement of the point of engagement between the internal and external gears. A suitable circuit for sequencing of the winding currents is described, for example, in U.S. Pat. No. 3,402,334.

The number of phases employed, as another example, could be as few as three or many more than four, in the case of unidirectional phase currents. The number of phases that can be excited at any one time, furthermore, can be as few as one and up to much larger numbers than two.

In order to permit the armature 2 to roll smoothly inside the stator 1, in spite of the gaps in the interior cylindrical surface caused by the slots, it may be desirable to provide rollers 14 and 14A at the ends of the armature. These rollers may be of slightly larger diameter than the outside surface of the ferromagnetic portion of the armature. The armature rollers contact races 16 and 16A inserted into the end pieces 17 and 17A attached to the stator 1. The materials of the rollers and races may be the same or dissimilar but, in general, will not be ferromagnetic. Plastic materials are preferred for certain of these parts in order to reduce weight and noise.

A second way of providing a smooth path for the armature to roll on, is simply to fill the stator slots with a suitable material after insertion of the windings and then to machine or grind the stator bore to a true cylindrical surface. Care must be taken, however, to avoid distortion of this surface with changes in temperature, as by using a filling material whose coefficient of thermal expansion is suitably close to that of the stator magnetic material.

Still another way of providing smooth rolling action for the armature is to skew the lamination slots so that the line of rolling contact bridges them. Suitable apparatus for doing this, without causing axially asymmetrical pull on the armature 2 in relation to the bearing 3, may involve doubly skewed slots 1A, as shown in the developed view of the stator 1 bore of FIG. 1A. Skewing is advantageous also because of the smoother progression of the line of rolling contact that is made possible, especially when more complex methods of exciting the windings are used, including use of non-square current waveforms.

It is important to note, in the configuration of FIG. 1, that the armature rotation for one revolution of the line of contact with the stator is less than the rotation of the inner gear 5 and the output element 8, because of the amplification of radial motion produced by shaft 4. For this reason, the bearing 3 must provide for relative rotation as well as angular freedom of the shaft 4 with respect to the armature 2. Because the radial motion of the armature is small compared with the distance from the center of the universal joint 7 to the center of bearing 3, the angular movement of shaft 4 is sufficiently small that conventional ball bearings can be used as the bearing 3.

The stator 1 and armature 2 can be made of either solid or laminated ferromagnetic material or molded from powder. The preferred form for most applications is to construct these parts in laminated form from high quality laminated magnetic material. In applications not requiring maximum performance, however, use of laminated material for the stator and solid material for the armature may result in lower cost.

When driving certain types of loads, particularly those with large amounts of inertia, moreover, the intrinsic damping of the stepping motor of FIG. 1 may not be sufficient to attenuate rapidly the transient oscillations of the output element that occur immediately after a sudden start or stop. Additional damping may be introduced by the means shown in FIG. 2, wherein the outer gear 6 is mounted in an elastomer cup 6A, which in turn is mounted in the end bell 11. This method of non-rigid mounting for the outer gear 6 allows it to rotate slightly under the transient conditions of starting or stopping. By suitable choice of the elastomer material, sufficient energy can be dissipated as the result of the slight motion so that a substantial increase in the effective damping of the machine is obtained. If the damping achieved in this manner is still insufficient, an alternative method is to suspend the outer gear 6 in a flexural or other type of bearing and couple it to an auxiliary electromagnetic or mechanical coulomb or viscous friction damping mechanism.

Figure 3A:
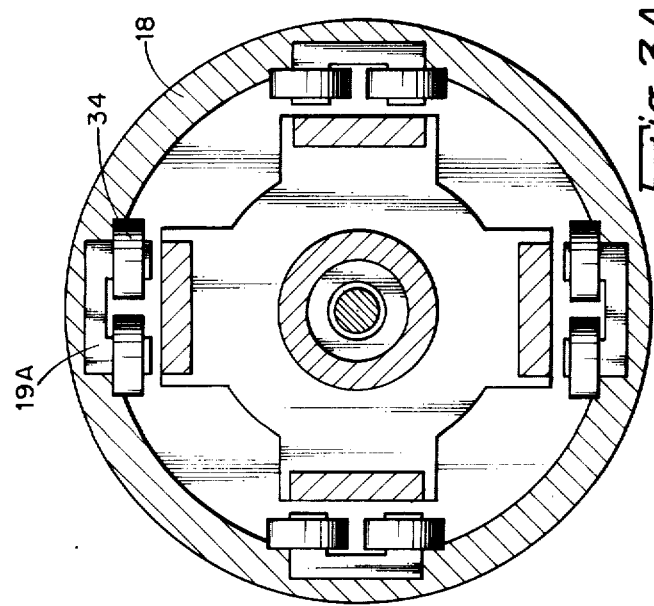
FIG. 3A is another cross-sectional view of the modified motor of FIG. 3; this view being taken normal to the machine longitudinal axis.

FIG. 3 illustrates another form or modification of this invention that further reduces the inertia of the armature elements and increases performance in some instances beyond that obtainable with the configuration of FIG. 1. Instead of a cylindrical armature, the particular construction of FIG. 3 embodies four armature elements or segments, one of which is indicated in axial section view at 19. The armatures are supported on flexure pivots, such as 20. The stator 18 comprises four magnets of two poles each, one of which is labeled 19A. FIG. 3A shows a sectional view of the stator and armature elements on a section plane normal to the machine axis. Each pole has an exciting winding, such as the winding 34. The free end of each armature element is extended so that the armature and its extension form a lever for mechanical amplification of the armature movement. These movements are transmitted by pushrods, such as 24, to a gyrating shaft 33 that further amplifies the armature movement in transmitting gyratory motion to inner gear 28 located at its end. This inner gear 28 engages outer gear 27 located in the hollow end of the output element 26. The shaft of the output element is supported in bearings 35 and 36 contained in end bell 23. The inner gear 28 is prevented from rotating by lugs located in the hub 29 that engage a slotted ring 30, which in turn is held by lugs on a stationary reaction member 31 fixed to the central support 32. The mechanism for prevention of rotation of the inner gear is shown in greater detail in FIG. 4. The inner gear is constrained in the axial direction by the gyrating shaft 33 equipped with a ball pivot 25, such that the inner gear 28 is able to gyrate under the influence of the forces delivered from the armature elements through the pushrods. Lubricant for all of the parts is confined to the central region surrounding the gears 27 and 28 by means of an elastic boot 37 held by clamps 37A and 38 and the shaft seal 39. The central support 32 is mounted between the end bells 21 and 23 after all of the parts associated with the armature elements have been installed.

Figure 4:
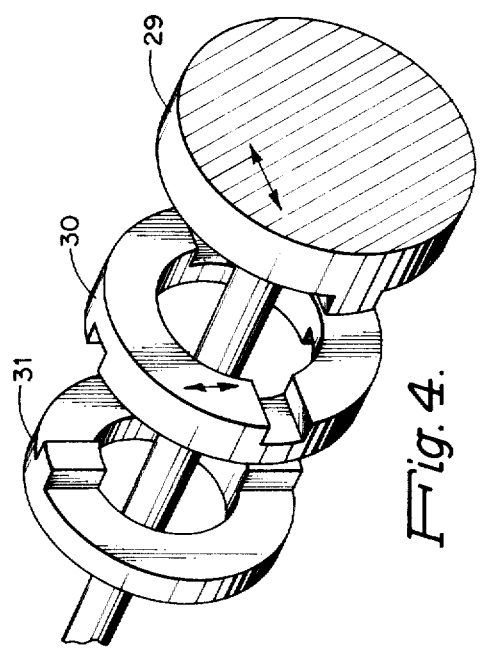
FIG. 4 illustrates a mechanism for preventing rotation of the inner gear of the oscillatory-to-unidirectional motion converter.

The operation of the embodiment of the invention illustrated in FIGS. 3, 3A, and 4 is similar, however, to that of FIG. 1 insofar as overall transduction from winding currents to rotation of the output element may be concerned. The difference in the operation of the two embodiments resides in the fact that the armature elements oscillate rather than roll as a cylinder inside of the stator. The oscillations of the armature elements, after amplification using the lever principle, are converted into a gyratory motion of the shaft 33 through the agency of the pushrods, such as 24. This gyratory motion is further amplified by shaft 33 to drive the inner gear 28. Because the inner gear is constrained so that it cannot rotate, the outer gear must rotate by the difference in the number of teeth of the two gears for each revolution of the point of engagement. Disengagement of the gears is prevented by appropriate means, such as described above in connection with the first configuration of FIG. 1.

Figure 5:
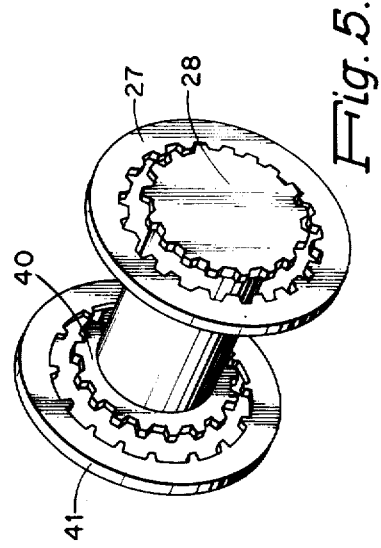
FIG. 5 shows a modified means for holding the inner gear stationary with respect to rotation.

FIG. 5 discloses an alternate means for keeping the inner gear 28 constrained so that it cannot rotate. Prevention of rotation is accomplished by engagement of another inner gear 40 with another outer gear 41. In contrast with the proper tooth shapes used with the gears 28 and 27, such as conventional involute or gerotor tooth forms, the teeth of gears 40 and 41 have modified shapes so that these gears may have the same number of teeth in spite of differences in pitch diameter. The outer gear 41 is held stationary. Since the gears 40 and 41 have the same number of teeth, rotation of the point of engagement causes zero rotation of the inner gears 40 and 28.

FIG. 6 shows still another embodiment of the invention. This machine converts electrical current pulses into linear motion of an output element 55. Four magnets 43 through 46, of form similar to the elements 19A of FIG. 3A, are contained within housing 42. The magnets are arranged in pairs with a single armature element 55 for the pair 43–44, and 56, for the pair 45–46. Forces can thus be developed on the armature 55 in the upward direction if magnet 44 is excited, and in the downward direction if magnet 43 is excited. One end of each armature is supported on a flexure pivot connected to the housing 42, with the free end of each armature extending in order to obtain lever action for amplifying the motion of the armature. The amplified motions are applied to pushrods 47 and 48 which, in turn, connect to levers 47A and 48A, where the oscillatory motion is further amplified and transmitted by push rods 49A and 50A to ball bearings 49 and 50, the inner races of which are mounted on eccentrics machined on shaft 53. The eccentrics are 90° phase-displaced. The shaft 53 is mounted in bearings 51 and 52. The central portion of the shaft has gear teeth milled into it to form a pinion 54 which meshes with rack 55, arranged to move in a direction perpendicular to the plane of FIG. 6. This rack constitutes the output element of this machine.

The machine of FIG. 6 can be operated in a two-magnet-on, two-magnet-off mode. In this mode of operation, assuming that magnets 44 and 46 are excited, the shaft 53 will assume a position, in the absence of a load force, such that both eccentrics are 45° displaced from their extreme upward positions. Upon receipt of a pulse at the input to the logic that actuates the driving circuitry, one or the other of magnets 44 or 46 will be switched off, depending upon the direction desired, and one or the other of the complement magnets 43 or 45 will be turned on. This causes the shaft 53 to rotate 90° into a new equilibrium position. This in turn will cause the rack 55 to advance or retract a distance corresponding to one step, in turn corresponding to 90° in the rotation of the shaft 53.

In the embodiment of FIG. 7, there is shown an alternate form for the magnets and armatures used in the various forms of this invention. By extending the pole pieces of the previously shown magnets, a magnet 57 of the form shown in FIG. 7 may be obtained. The magnet is excited by windings, such as the coils 59 and 60. The armature 58 is trapezoidal in cross section and, when fully displaced in the upward direction, it will bridge the gap between the magnet poles 61 and 62. This form of magnet and armature is preferred in applications requiring the highest performance since the inertia of the armature is reduced to a minimum.

Figure 8:
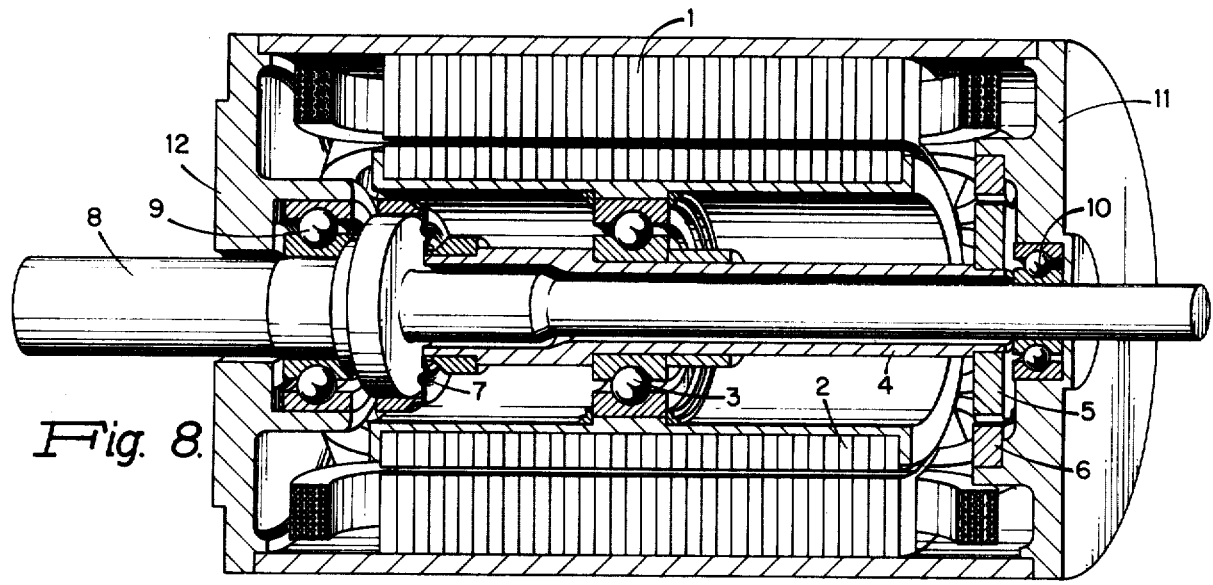
FIG. 8 is a sectional view of a further modification embodying a "rolling armature" version of the invention, similar to FIG. 1, but with provision for a through-shaft output member.

FIG. 8, as before mentioned, is a section view of an embodiment of the invention similar to FIG. 1, but modified to permit the output shaft 8 to extend through the machine so that a shaft encoder or other equipment can be driven from the end extending from end bell 11, without the need for gearing from the load-driving end extending from end bell 12. This through-shaft arrangement is made possible by the use of the hollow gyrating shaft 4 of FIG. 8 instead of the solid one of FIG. 1. The modified form of FIG. 8 does not use rollers and races to provide a smooth path for the rolling armature, but rather employs either filled stator slots or doubly skewed laminations as of the type shown in FIG. 1A. Also, instead of the universal joint 7 of the structure of FIG. 1, the configuration of FIG. 8 uses a diaphragm form of flexible coupling 7 to serve this function.

In certain applications of the invention, furthermore, the armature cannot be allowed to rock so that it tends to roll with its axis not parallel to the output shaft axis. This is for reasons of noise or axial forces that arise from the resulting tendency of the armature to screw its way axially along the stator bore. Two ways of preventing armature rocking in those instances where it cannot be tolerated are shown in FIGS. 9 and 10.

Figure 9:
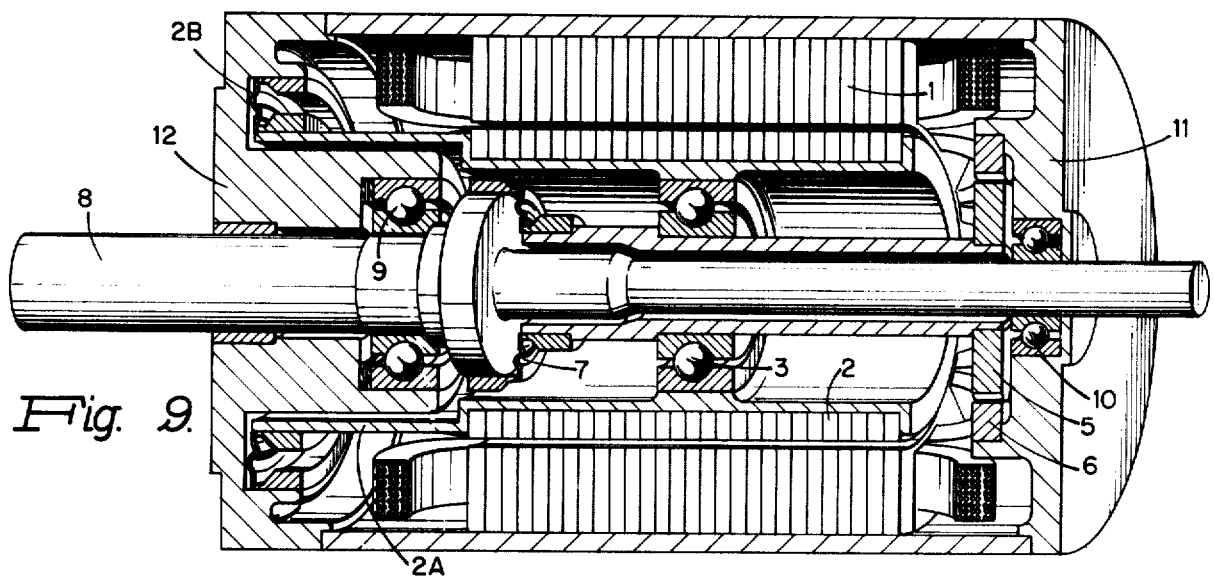
FIG. 9 is a sectional view of still another modification wherein the armature gyrates but does not rotate.

In the configuration of FIG. 9, the armature rocking problem is avoided by not allowing the armature to roll on the stator bore. The armature 2 is constrained by additional suspension elements to gyrate without touching the stator 1, this being accomplished by a tubular extension 2A to the support for the armature laminations that terminates in a diaphragm form of flexure pivot 2B. The armature surface is made conical if the stator bore is cylindrical, or vice versa, so that substantial parallelity of these surfaces is achieved in the region of closest approach.

Another way of reducing the uncertainty of armature axis location, which is associated with suspension on the single bearing 3 in FIGS. 1 and 8, is to use the arrangement of FIG. 9 with the modification of substituting for the flexure pivot 2B, a ball or other bearing that is designed to accommodate the smaller angular movement associated with armature gyration. With this embodiment, the armature can roll as well as gyrate, thereby allowing the air gap to go to zero for at least one point of contact with the stator bore. This reduction in minimum air gap over that of FIG. 9 raises the dynamic performance of the machine somewhat, although at the cost of a slight increase in noise. When the armature is suspended to both gyrate and roll, its surface should be designed in relation to the stator bore to have rolling contact over a narrow circular band, preferably located near the plane of bearing 3, in order to avoid excessive slippage. This can be accomplished by using a cylindrical stator bore and an approximately conical armature that has been slightly crowned.

Figure 10:
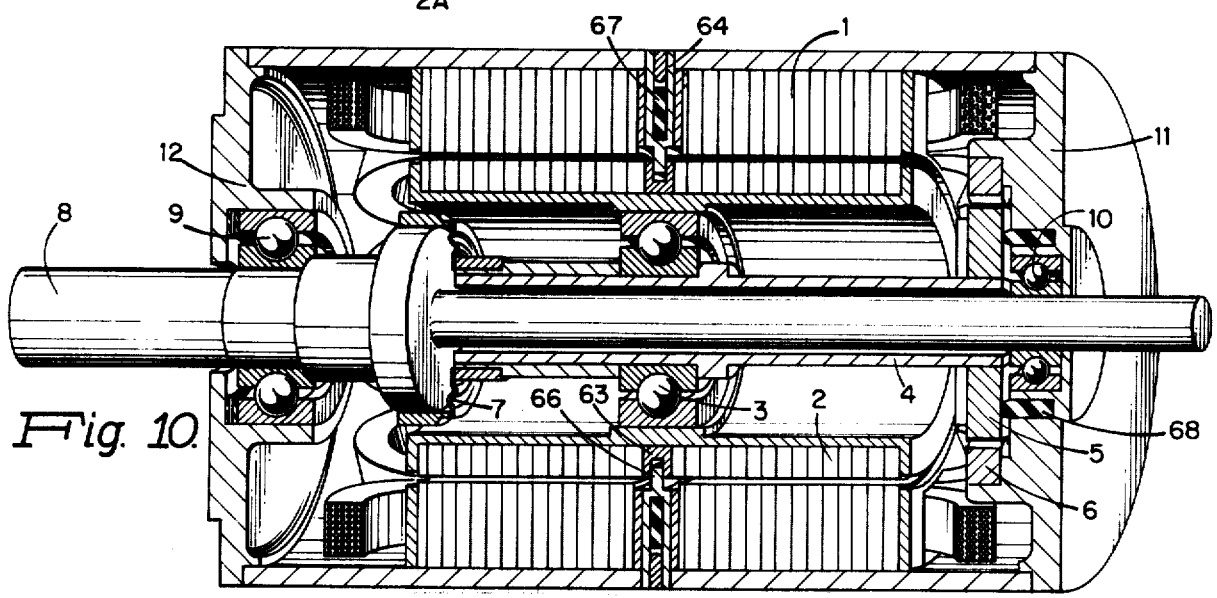
FIG. 10 is a sectional view of another configuration that, while similar to the embodiment of FIG. 1, provides an anti-rocking mechanism for the armature.

In the embodiment of FIG. 10, the armature is permitted to roll while preventing rocking, by providing a center part in the form of a ring 63 of hard material in which a groove has been machined. The stator 1 is also equipped with a central member 64 which carries a plurality of equally spaced pins 65. These pins have flat end portions 66, which act as keys that engage the groove in the armature ring 63. This arrangement permits the armature to roll but constrains it so that it cannot rock. Lubrication can be provided by oil wicks 67 located in drilled holes in the pins with small passages provided to feed oil to the end portions 66. In addition, lubrication for the gears 5 and 6 can be provided by a plurality of oiled felt plugs 68 arranged to touch the inner gear 5. Alternatively, lubrication for these parts can be provided by grease or solid lubricants suitably applied.

In summary, all of the embodiments employing the techniques of the invention employ magnets and armatures in which the armature movement is predominantly normal to the air gap or has a substantial component normal to the air gap so as to vary the gap thickness. These magnets and armatures are the means for converting electrical energy into mechanical motion. In order to be effective in stepping motor applications such magnets and armatures are arranged so that the movement of the armature is small compared to the usual movements of the armatures of ordinary relays and similar devices. In order efficiently to convert the small armature movements into unidirectional motion of the output element, moreover, the armature motion is first amplified, as for example by the use of levers, and then the amplified movement is applied to conversion means for translating small oscillatory movements into unidirectional motion.

A machine, constructed according to the embodiment of FIG. 1, with a laminated stator and solid armature, has been successfully constructed and tested with the following results, when operated in the before-described two-phase-on, two-phase-off mode:

| | |
|---|---|
| Resistance, each of four phases, at 21°C, R | 2.0 ohms |
| Inductance, each of four phases, at 21°C, L | 0.027 henries |
| No. of stator poles | 16 |
| Step size $S_m$ | 6 degrees |
| Moment of inertia $M_m$ | 67.8 gm cm$^2$ |
| Current per phase I | 2.0 amp |
| Torque, at slow step rate against friction load, $F_m$ | $1.4 \times 10^6$ dyne cm |
| Upper limit on stepping frequency, start-stop, $N_{uf}$ | 800 sec$^{-1}$ |
| Work per step, $W_s$ | 0.015 joules |
| Product, $W_s N_{uf}$ | 12 watts |
| Maximum continuous stepping frequency, slowly accelerated | 1330 sec$^{-1}$ |
| Maximum stepping frequency, start-stop, with 210 gm cm$^2$ inertia load | 390 sec$^{-1}$ |

The ratio of the work per step to the magnetic stored energy per phase in this machine was 0.28, a figure that is higher than most other state-of-the-art machines, with the implication that this new machine will be easier to drive than other machines of comparable work-per-step rating. The above data were taken with a motor power supply voltage 58 volts, 25 ohm resistors in series with the motor phases, and standard transistor circuits for driving the maching of substantially the type described by R. A. Yackel, FIG. 3, page 155 of Symposium Proceedings, "Incremental Motion Control Systems and Devices," Part 1, "Step Motors and Controls" edited by Prof. B. C. Kuo, and published by Department of Electrical Engineering, University of Illinois, March 1972. A 125-ohm snubbing resistor was used, giving a peak collector voltage across the output power transistors of 250 volts. The armature outside diameter was 1.629 inches; its length, 1.310 inches, and its thickness, 0.100 inch. The peak-to-peak amplitude of the armature motion was 0.017 inches. The amplification provided by the lever action of shaft 4 was 5.18. The external gear 5 had 60 teeth; the internal gear 6, 64 teeth. Both gears were 64 diametrical pitch, 20° pressure angle, and of involute tooth form.

Many other amplifying means, conversion means and other modifications are possible, and the invention is not, of course, limited to the specific embodiments shown herein; the scope and spirit of the invention, embracing the above and other modifications that will suggest themselves to those skilled in this art, being as defined in the appended claims.

What is claimed is:

1. A synchronous stepping motor machine, having, in combination, housing means; stator means provided with a plurality of poles, fixed in said housing means; armature means separated by air gaps from said poles; electrical means, comprising windings connected with current sources, for sequentially magnetizing said stator poles, thereby producing magnetic flux in the air gaps associated with the magnetized poles; suspension means for maintaining said armature means properly oriented with respect to said stator means and for suspending said armature means for oscillatory movement thereof in directions to substantially vary the thickness of said air gaps; an output member; bearings supporting said output member for movement with respect to said housing means; means for mechanically amplifying the oscillatory movements of said armature means; conversion means interconnecting said amplifying means, housing means and output member for converting the amplified oscillatory movement of the armature means into movement of said output member that is unidirectional for at least more than one half cycle of armature means movement; and means for limiting the thickness variations of said air gaps from substantially zero to the order of a few thousandths of an inch such that the said magnetic flux, under conditions of near maximum machine performance, changes substantially less than the corresponding fractional change in the air gap thickness.

2. A synchronous machine as claimed in claim 1 and in which said armature means is mounted to move with a substantial component normal to said air gaps.

3. A synchronous machine as claimed in claim 2 and in which said armature means comprises elements separate from, but mechanically coupled to said amplifying means.

4. A synchronous machine as claimed in claim 2 and in which said limiting means is adjusted to minimize the magnetic energy stored in said air gaps under conditions of closest approach of said armature means to said stator means poles during said oscillatory movement.

5. A synchronous machine as claimed in claim 2 and in which said amplifying means comprises elements at least one of which is flexibly connected with said armature means.

6. A synchronous machine as claimed in claim 1 and in which said conversion means comprises universal joint means.

7. A synchronous machine as claimed in claim 6 and in which said universal joint means is of a flexure type.

8. A synchronous machine as claimed in claim 1 and in which said conversion means comprises cooperative internal and external gear means.

9. A synchronous machine as claimed in claim 8 and in which said gear means are of gerotor tooth form.

10. A synchronous machine as claimed in claim 1 and in which said suspension means comprises at least one supporting member additional to said amplifying means and mechanically connected to said housing means.

11. A synchronous machine as claimed in claim 1 and in which said suspension means comprises means for supporting said armature means for rotation as well as oscillation.

12. A synchronous machine as claimed in claim 11 and in which said suspension means comprises means for permitting rolling of the armature means on the interior surface of the stator means.

13. A synchronous machine as claimed in claim 12 and in which means is provided for insuring smooth armature rolling.

14. A synchronous machine as claimed in claim 11 and in which said stator means has filled stator slots.

15. A synchronous machine as claimed in claim 11 and in which said stator means has skewed stator laminations.

16. A synchronous machine as claimed in claim 11 and in which means is provided for enabling said rotation at a different angular velocity than that of said output member.

17. A synchronous machine as claimed in claim 1 and in which said output member extends through said machine through hollow gyrating shaft means.

18. A synchronous machine as claimed in claim 1 and in which means is provided for restraining said armature means against rocking.

19. A synchronous machine as claimed in claim 18 and in which said restraining means comprises means for enabling armature means gyration without contacting said stator means and with substantially parallelity thereto in the region of closest approach thereto.

20. A synchronous machine as claimed in claim 1 and in which means is provided for accommodating the small angular movement associated with armature means gyration such that the armature means may roll as well as gyrate to allow said air gap to approach zero for at least one point of approach to said stator means.

21. A synchronous stepping motor machine, having, in combination, stator means comprising a plurality of poles associated with a corresponding plurality of windings; means for applying current pulses to the windings in a plurality of electrical phases; armature means separated by air gaps from said poles; means supporting said armature means for movement with a substantial component normal to, and so as effectively to vary the thickness of, said air gaps; output means carried by a housing containing the stator and armature means; means at least part of which is flexibly connected to the armature means for mechanically amplifying the air-gap-varying movement of the armature means as oscillatory movement; means for limiting the thickness variations of said air gaps from substantially zero to the order of a few thousandths of an inch such that magnetic flux in said air gaps, under conditions of near maximum machine performance, changes substantially less than the corresponding fractionaal change in the air gap thickness; and conversion means connected to said amplifying means and to said housing for converting the amplified oscillatory movement of the armature means into movement of said output means unidirectionally for at least more than one half cycle of the armature means movement.

22. A synchronous machine as claimed in claim 21 and in which said conversion means comprises means for producing linear movement of said output means.

23. A synchronous machine as claimed in claim 21 and in which said conversion means comprises means for producing rotary movement of said output means.

24. A synchronous stepping motor machine, having, in combination, stator means comprising a plurality of poles associated with a corresponding plurality of windings; means for applying current pulses to the windings in a plurality of electrical phases; armature means separated by air gaps from said poles; means supporting said armature means for movement with a substantial component normal to, and so as effectively to vary the thickness of, said air gaps; output means carried by a housing containing the stator and armature means; means at least part of which is flexibly connected to the armature means for mechanically amplifying the air-gap-varying movement of the armature means as oscillatory movement; and conversion means connected to said amplifying means and to said housing for converting the amplified oscillatory movement of the armature means into movement of said output means unidirectionally for at least more than one half cycle of the armature means movement, said conversion means comprising an internal gear carried by said housing, an external gear driven by said amplifying means, and means meshing said gears hypocycloidally to produce rotary movement of said output means.

25. A synchronous machine as claimed in claim 24 and in which damping means is provided for fixing the internal gear to the housing to absorb vibrational energy of the output means induced during machine starting and stopping.

26. A synchronous machine as claimed in claim 24 and in which there is provided means comprising a toothed bridge extending on either side of the point of gear mesh for holding said gears in full mesh at such a point.

27. A synchronous machine as claimed in claim 24 and in which there is provided means comprising a first tip on the shaft of the external gear and a second tip fixed to said housing so that the first tip is constrained to travel in a circular path around the second tip in order to hold said gears in full mesh at a point.

28. A synchronous machine as claimed in claim 21 and in which said amplifying means comprises off-axis linkage means connected with said armature means to produce conical amplified movement of the movement of the armature means.

29. A method of operating a synchronous machine having an armature mounted to move with a substantial component normal to the air gaps between the armature and a plurality of stator poles, said method comprising, rotating the armature with respect to the stator while permitting oscillatory movement thereof in directions substantially to vary the thickness of the air gaps between the armature and stator poles, mechanically amplifying the oscillatory movement of the armature, converting the amplified oscillatory movement into an output movement that is unidirectional for at least more than one half cycle of armature movement, and limiting the said oscillatory movement so that said air gap thicknesses are controlled to vary from substantially zero to the order of a few thousandths of an inch to maintain the resulting changes in magnetic flux in said air gaps under conditions of near maximum machine performance substantially less than the corresponding fractional changes in the said air gap thickness and to minimize the magnetic energy stored in said air gaps under conditions of closest approach of the armature to the stator poles during said oscillatory movement.

* * * * *